United States Patent
Karami et al.

(10) Patent No.: US 8,124,663 B2
(45) Date of Patent: Feb. 28, 2012

(54) FOAMED ISOCYANATE-BASED POLYMER HAVING IMPROVED HARDNESS PROPERTIES AND PROCESS FOR PRODUCTION THEREOF

(75) Inventors: Askar Karami, Toronto (CA); George Ng, Richmond Hill (CA); Le Tang, Richmond Hill (CA)

(73) Assignee: Proprietect L.P. (CA)

( * ) Notice: Subject to any disclaimer, the term of this patent is extended or adjusted under 35 U.S.C. 154(b) by 632 days.

(21) Appl. No.: 11/781,543

(22) Filed: Jul. 23, 2007

(65) Prior Publication Data

US 2008/0015275 A1    Jan. 17, 2008

Related U.S. Application Data

(63) Continuation of application No. 10/717,901, filed on Nov. 21, 2003, now abandoned.

(60) Provisional application No. 60/428,279, filed on Nov. 22, 2002.

(51) Int. Cl.
*C08G 18/28* (2006.01)

(52) U.S. Cl. .............. 521/117; 252/182.24; 252/182.27; 521/130; 521/137; 521/155; 521/158; 521/163; 521/164; 521/170; 521/174; 521/180; 521/181; 521/186; 521/187

(58) Field of Classification Search .................. 521/117, 521/130, 137, 170, 174, 155, 158, 163, 164, 521/180, 181, 186, 187; 252/182.24, 182.27
See application file for complete search history.

(56) References Cited

U.S. PATENT DOCUMENTS

| 4,698,370 | A | * | 10/1987 | Saeki et al. | .................... 521/128 |
| 5,457,138 | A | | 10/1995 | Yuge et al. | |
| 5,621,043 | A | * | 4/1997 | Croft | ............................. 525/111 |
| 5,756,642 | A | | 5/1998 | Hutchings et al. | |
| 6,706,774 | B2 | | 3/2004 | Munzenberger et al. | |
| 6,767,929 | B2 | | 7/2004 | Ishikawa et al. | |
| 6,855,741 | B2 | * | 2/2005 | Wiese et al. | .................. 521/117 |

FOREIGN PATENT DOCUMENTS

WO    WO 00/73368    * 12/2000

OTHER PUBLICATIONS

Georgia Pacific Technical Data Sheet (Novolak Resins) Oct. 2002.

* cited by examiner

*Primary Examiner* — John Cooney

(74) *Attorney, Agent, or Firm* — Katten Muchin Rosenman LLP

(57) ABSTRACT

The invention relates to the surprising and unexpected discovery that a sub-group of phenolic resins (i.e., those which are substantially completely free of ether moieties) is particularly advantageous to confer load building properties to an isocyanate-based foam (e.g., a polyurethane foam). Indeed, its possible to utilize the sub-group of phenolic resins to partially or fully displace copolymer polyols conventionally used to confer load building characteristics to isocyanate-based polymer foams. Further, the invention relates to the surprising and unexpected discovery that a sub-group of phenolic resins (i.e., those which are substantially completely free of ether moieties) is particularly advantageous to confer energy absorption properties in an isocyanate-based foam.

45 Claims, No Drawings

FOAMED ISOCYANATE-BASED POLYMER HAVING IMPROVED HARDNESS PROPERTIES AND PROCESS FOR PRODUCTION THEREOF

This is a continuation of U.S. patent application Ser. No. 10/717,901, filed Nov. 21, 2003 now abandoned, which claims the benefit of U.S. Provisional Application No. 60/428,279, filed Nov. 22, 2002, the contents of which are incorporated herein by reference.

BACKGROUND OF THE INVENTION

1. Field of the Invention

In one of its aspects, the present invention relates to a foamed isocyanate-based polymer having improved hardness properties. In another of its aspects, the present invention relates to a process for the production of such a foamed isocyanate-based polymer. In yet another of its aspects, the present invention relates to a method for improving the hardness characteristics of an isocyanate-based foam. In yet another of its aspects, the present invention relates to a dispersion of a particular phenolic resin and an active hydrogen-containing compound useful in the production of foamed isocyanate-based polymer.

2. Description of the Prior Art

Isocyanate-based polymers are known in the art. Generally, those of skill in the art understand isocyanate-based polymers to be polyurethanes, polyureas, polyisocyanurates and mixtures thereof.

It is also known in the art to produce foamed isocyanate-based polymers. Indeed, one of the advantages of isocyanate-based polymers compared to other polymer systems is that polymerization and foaming can occur in situ. This results in the ability to mould the polymer while it is forming and expanding.

One of the conventional ways to produce a polyurethane foam is known as the "one-shot" technique. In this technique, the isocyanate, a suitable polyol, a catalyst, water (which acts as a reactive "blowing" agent and can optionally be supplemented with one or more physical blowing agents) and other additives are mixed together at once using, for example, impingement mixing (e.g., high pressure). Generally, if one were to produce a polyurea, the polyol would be replaced with a suitable polyamine. A polyisocyanurate may result from cyclotrimerization of the isocyanate component. Urethane modified polyureas or polyisocyanurates are known in the art. In either scenario, the reactants would be intimately mixed very quickly using a suitable mixing technique.

Another technique for producing foamed isocyanate-based polymers is known as the "prepolymer" technique. In this technique, a prepolymer is produced by reacting polyol and isocyanate (in the case of a polyurethane) in an inert atmosphere to form a liquid polymer terminated with reactive groups (e.g., isocyanate moieties and active hydrogen moieties). To produce the foamed polymer, the prepolymer is thoroughly mixed with a lower molecular weight polyol (in the case of producing a polyurethane) or a polyamine (in the case of producing a modified polyurea) in the presence of a curing agent and other additives, as needed.

Regardless of the technique used, it is known in the art to include a filler material in the reaction mixture. Conventionally, filler materials have been introduced into foamed polymers by loading the filler material into one or both of the liquid isocyanate and the liquid active hydrogen-containing compound (i.e., the polyol in the case of polyurethane, the polyamine in the case of polyurea, etc.). Generally, incorporation of the filler material serves the purpose of conferring so-called load building properties to the resulting foam product.

The nature and relative amounts of filler materials used in the reaction mixture can vary, to a certain extent, depending on the desired physical properties of the foamed polymer product, and limitations imposed by mixing techniques, the stability of the system and equipment imposed limitations (e.g., due to the particle size of the filler material being incompatible with narrow passages, orifices and the like of the equipment).

One known technique of incorporating a solid material in the foam product for the purpose of improving hardness properties involves the use of a polyol-solids dispersion, particularly one in the form of a graft copolymer polyol. As is known in the art, graft copolymer polyols are polyols, preferably polyether polyols, which contain other organic polymers. It is known that such graft copolymer polyols are useful to confer hardness (i.e., load building) to the resultant polyurethane foam compared to the use of polyols which have not been modified by incorporating the organic polymers. Within graft copolymer polyols, there are two main categories which may be discussed: (i) chain-growth copolymer polyols, and (ii) step-growth copolymer polyols.

Chain-growth copolymer polyols generally are prepared by free radical polymerization of monomers in a polyol carrier to produce a free radical polymer dispersed in the polyol carrier. Conventionally, the free radical polymer can be based on acrylonitrile or styrene-acrylonitrile (SAN). The solids content of the polyol is typically up to about 60%, usually in the range of from about 15% to about 40%, by weight of the total weight of the composition (i.e., free radical polymer and polyol carrier). Generally, these chain-growth copolymer polyols have a viscosity in the range of from about 2,000 to about 8,000 centipoise. When producing such chain-growth copolymer polyols, it is known to induce grafting of the polyol chains to the free-radical polymer.

Step-growth copolymer polyols generally are characterized as follows: (i) PHD (Polyharnstoff Disperion) polyols, (ii) PIPA (Poly Isocyanate Poly Addition) polyols, and (iii) epoxy dispersion polyols. PHD polyols are dispersions of polyurea particles in conventional polyols and generally are formed by the reaction of a diamine (e.g., hydrazine) with a diisocyanate (e.g., toluene diisocyanate) in the presence of a polyether polyol. The solids content of the PHD polyols is typically up to about 50%, usually in the range of from about 15% to about 40%, by weight of the total weight of the composition (i.e., polyurea particles and polyol carrier). Generally, PHD polyols have a viscosity in the range of from about 2,000 to about 6,000 centipoise. PIPA polyols are similar to PHD polyols but contain polyurethane particles instead of polyurea particles. The polyurethane particles in PIPA polyols are formed in situ by reaction of an isocyanate and alkanolamine (e.g., triethanolamine). The solids content of the PIPA polyols is typically up to about 80%, usually in the range of from about 15% to about 70%, by weight of the total weight of the composition (i.e., polyurethane particles and polyol carrier). Generally, PIPA polyols have a viscosity in the range of from about 4,000 to about 50,000 centipoise. See, for example, U.S. Pat. Nos. 4,374,209 and 5,292,778. Epoxy dispersion polyols are based on dispersions of cured epoxy resins in conventional based polyols. The epoxy particles are purportedly high modulus solids with improved hydrogen bonding characteristics.

Further information regarding useful graft copolymer polyols may be found, for example, in Chapter 2 of "Flexible Polyurethane Foams" by Herrington and Hock (1997) and the references cited therein.

U.S. Pat. No. 4,490,490 [Patton, Jr. et al. (Patton)] teaches high load bearing flexible polyurethane foams. More specifically, Patton teaches the preparation of a flexible polyurethane foam by reacting a mixture comprising a polyol, an organic polyisocyanate, a blowing agent, a surfactant and a catalyst for the urethane reaction. The polyol component contains 5 to 25 weight percent of a hydroxyl compound-modified benzyl ether-containing resole polyol obtained by a particular process. Apparently, addition of hydroxyl compound-modified benzyl ether-containing resole polyols ("modified resole polyol") to a formulation used to prepare a flexible polyurethane foam results in a foam with enhanced load-bearing properties.

Despite the advances made in the art, there exists a continued need for the development of novel load building techniques. Specifically, many of the prior art approaches discussed hereinabove involve the use of relatively expensive materials (e.g., the graft copolymer polyols described above) which can be complicated to utilize in a commercial size facility. Further, while the use of the resole polyol described in Patton appears to provide some improvement in the load bearing properties of the foam, there is room for improvement. Thus, it would be desirable to have a load building technique which could be conveniently applied to polyurethane foam as an alternative to conventional load building techniques. It would be further desirable if the load building technique: was relatively inexpensive and/or improved other properties of the polyurethane foam and/or could be incorporated into an existing production scheme without great difficulty.

SUMMARY OF THE INVENTION

It is an object of the present invention to provide a novel isocyanate-based polymer foam which obviates or mitigates at least one of the above-mentioned disadvantages of the prior art.

It is another object of the present invention to provide a novel approach to conferring load building properties to an isocyanate-based polymer foam.

It is another object of the present invention to provide a novel approach to conferring energy absorbing properties to an isocyanate-based polymer foam.

It is yet another object of the present invention to provide a novel process for production of an isocyanate-based polymer foam.

Accordingly, in one of its objects, the present invention provides a foamed isocyanate-based polymer derived from a reaction mixture comprising an isocyanate, an active hydrogen-containing compound, a phenolic resin and a blowing agent; wherein the phenolic resin is substantially completely free of ether moieties.

In yet another of its aspects, the present invention provides a process for producing a foamed isocyanate-based polymer comprising the steps of:

contacting an isocyanate, an active hydrogen-containing compound, a phenolic resin and a blowing agent to form a reaction mixture; and expanding the reaction mixture to produce the foamed isocyanate-based polymer;

wherein the phenolic resin is substantially completely free of ether moieties.

In yet another of its aspects, the present invention provides a foamed isocyanate-based polymer derived from a reaction mixture comprising an isocyanate, an active hydrogen-containing compound, a phenolic resin substantially completely free of ether moieties and a blowing agent; the foamed isocyanate-based polymer having an Indentation Force Deflection loss when measured pursuant to ASTM D3574 which is less than that of a reference foam produced by substituting a copolymer polyol for the phenolic resin in the reaction mixture, the foamed isocyanate-based polymer and the reference foam having substantially the same density and Indentation Force Deflection when measured pursuant to ASTM D3574 (50 in$^2$ indentor; 15"×15"×4" sample size; 25° C., 50% relative humidity).

In yet another of its aspects, the present invention provides a foamed isocyanate-based polymer derived from a reaction mixture comprising an isocyanate, an active hydrogen-containing compound, a phenolic resin substantially completely free of ether moieties and a blowing agent; the foamed isocyanate-based polymer having thickness loss when measured pursuant to ASTM D3574 which is less than that of a reference foam produced by substituting a copolymer polyol for the phenolic resin in the reaction mixture, the foamed isocyanate-based polymer and the reference foam having substantially the same density and Indentation Force Deflection when measured pursuant to ASTM D3574.

The present inventors have surprisingly and unexpectedly discovered that a sub-group of phenolic resins (as described in more detailed hereinbelow) is particularly advantageous to confer load building properties to an isocyanate-based foam. Indeed, as will be developed in the Examples hereinbelow, its possible to utilize the sub-group of phenolic resins to partially or fully displace copolymer polyols conventionally used to confer load building characteristics to isocyanate-based polymer foams. Further, the present inventors have surprisingly and unexpectedly discovered that a sub-group of phenolic resins (as described in more detailed hereinbelow) is particularly advantageous to confer energy absorption properties in an isocyanate-based foam.

Preferred aspects of the present invention relate to the ability to mix up to about 20% by weight of the phenolic resin with a polyether polyol having an OH number less than about 40 mg KOH/g to form a stable liquid at 23° C. As used throughout this specification, the term "stable liquid", when used in connection with this solubility parameter of the phenolic resin, is intended to mean that the liquid formed upon mixing the phenolic resin and the polyol has a substantial constant light transmittance (transparent at one extreme and opaque at the other extreme) for at least 2 hours, preferably at least 30 days, more preferably a number of months, after production of the mixture. Practically, in one embodiment, the stable liquid will be in the form a clear, homogeneous liquid (e.g., a solution) which will remain as such over time. In another embodiment, the stable liquid will be in the form an emulsion of (at least a portion of) the phenolic resin in the polyol which will remain as such over time—i.e., the phenolic resin will not settle out over time.

DETAILED DESCRIPTION OF THE PREFERRED EMBODIMENTS

As used throughout this specification, the term "isocyanate-based polymer" is intended to mean, inter alia, polyurethane, polyurea and polyisocyanurate.

The present invention is related to foamed isocyanate-based polymer and to a process for production thereof. Preferably, the isocyanate-based polymer is selected from the group comprising polyurethane, polyurea, polyisocyanurate, urea-modified polyurethane, urethane-modified polyurea, urethane-modified polyisocyanurate and urea-modified polyisocyanurate. As is known in the art, the term "modified", when used in conjunction with a polyurethane, polyurea or polyisocyanurate means that up to 50% of the polymer backbone forming linkages have been substituted.

The present foamed isocyanate-based polymer is produced from a reaction mixture which comprises an isocyanate, an active hydrogen-containing compound, a blowing agent and a phenolic resin substantially completely free of ether moieties.

The isocyanate suitable for use in the reaction mixture is not particularly restricted and the choice thereof is within the purview of a person skilled in the art. Generally, the isocyanate compound suitable for use may be represented by the general formula:

$$Q(NCO)_i$$

wherein i is an integer of two or more and Q is an organic radical having the valence of i. Q may be a substituted or unsubstituted hydrocarbon group (e.g., an alkylene or arylene group). Moreover, Q may be represented by the general formula:

$$Q^1-Z-Q^1$$

wherein $Q^1$ is an alkylene or arylene group and Z is chosen from the group comprising —O—, —O-$Q^1$-, —CO—, —S—, —S-$Q^1$-S— and —SO$_2$—. Examples of isocyanate compounds which fall within the scope of this definition include hexamethylene diisocyanate, 1,8-diisocyanato-p-methane, xylyl diisocyanate, (OCNCH$_2$CH$_2$CH$_2$OCH$_2$O)$_2$, 1-methyl-2,4-diisocyanatocyclohexane, phenylene diisocyanates, tolylene diisocyanates, chlorophenylene diisocyanates, diphenylmethane-4,4'-diisocyanate, naphthalene-1,5-diisocyanate, triphenylmethane-4,4',4"-triisocyanate and isopropylbenzene-alpha-4-diisocyanate.

In another embodiment, Q may also represent a polyurethane radical having a valence of i. In this case Q(NCO)$_i$ is a compound which is commonly referred to in the art as a prepolymer. Generally, a prepolymer may be prepared by reacting a stoichiometric excess of an isocyanate compound (as defined hereinabove) with an active hydrogen-containing compound (as defined hereinafter), preferably the polyhydroxyl-containing materials or polyols described below. In this embodiment, the polyisocyanate may be, for example, used in proportions of from about 30 percent to about 200 percent stoichiometric excess with respect to the proportion of hydroxyl in the polyol. Since the process of the present invention may relate to the production of polyurea foams, it will be appreciated that in this embodiment, the prepolymer could be used to prepare a polyurethane modified polyurea.

In another embodiment, the isocyanate compound suitable for use in the process of the present invention may be selected from dimers and trimers of isocyanates and diisocyanates, and from polymeric diisocyanates having the general formula:

$$[Q''(NCO)_i]_j$$

wherein both i and j are integers having a value of 2 or more, and Q□ is a polyfunctional organic radical, and/or, as additional components in the reaction mixture, compounds having the general formula:

$$L(NCO)_i$$

wherein i is an integer having a value of 1 or more and L is a monofunctional or polyfunctional atom or radical. Examples of isocyanate compounds which fall with the scope of this definition include ethylphosphonic diisocyanate, phenylphosphonic diisocyanate, compounds which contain a =Si—NCO group, isocyanate compounds derived from sulphonamides (QSO$_2$NCO), cyanic acid and thiocyanic acid.

See also for example, British patent number 1,453,258, for a discussion of suitable isocyanates.

Non-limiting examples of suitable isocyanates include: 1,6-hexamethylene diisocyanate, 1,4-butylene diisocyanate, furfurylidene diisocyanate, 2,4-toluene diisocyanate, 2,6-toluene diisocyanate, 2,4'-diphenylmethane diisocyanate, 4,4'-diphenylmethane diisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenzene, 2,4-diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitolylene diisocyanate, 1,4-xylylene diisocyanate, 1,3-xylylene diisocyanate, bis-(4-isocyanatophenyl)methane, bis-(3-methyl-4-isocyanatophenyl)methane, polymethylene polyphenyl polyisocyanates and mixtures thereof. A more preferred isocyanate is selected from the group comprising 2,4-toluene diisocyanate, 2,6-toluene diisocyanate and mixtures thereof, for example, a mixture comprising from about 75 to about 85 percent by weight 2,4-toluene diisocyanate and from about 15 to about 25 percent by weight 2,6-toluene diisocyanate. Another more preferred isocyanate is selected from the group comprising 2,4'-diphenylmethane diisocyanate, 4,4'-diphenylmethane diisocyanate and mixtures thereof. The most preferred isocyanate is a mixture comprising from about 15 to about 25 percent by weight 2,4'-diphenylmethane diisocyanate and from about 75 to about 85 percent by weight 4,4'-diphenylmethane diisocyanate.

If the process is utilized to produce a polyurethane foam, the active hydrogen-containing compound is typically a polyol. The choice of polyol is not particularly restricted and is within the purview of a person skilled in the art. For example, the polyol may be a hydroxyl-terminated backbone of a member selected from the group comprising polyether, polyester, polycarbonate, polydiene and polycaprolactone. Preferably, the polyol is selected from the group comprising hydroxyl-terminated polyhydrocarbons, hydroxyl-terminated polyformals, fatty acid triglycerides, hydroxyl-terminated polyesters, hydroxymethyl-terminated polyesters, hydroxymethyl-terminated perfluoromethylenes, polyalkyleneether glycols, polyalkylenearyleneether glycols and polyalkyleneether triols. More preferred polyols are selected from the group comprising adipic acid-ethylene glycol polyester, poly(butylene glycol), poly(propylene glycol) and hydroxyl-terminated polybutadiene—see, for example, British patent number 1,482,213, for a discussion of suitable polyols. Preferably, such a polyether polyol has a molecular weight in the range of from about 200 to about 10,000, more preferably from about 2,000 to about 7,000, most preferably from about 2,000 to about 6,000.

Of course the polyol may be a polyol-solids dispersion as discussed hereinabove.

If the process is utilized to produce a polyurea foam, the active hydrogen-containing compound comprises compounds wherein hydrogen is bonded to nitrogen. Preferably such compounds are selected from the group comprising polyamines, polyamides, polyimines and polyolamines, more preferably polyamines. Non-limiting examples of such compounds include primary and secondary amine terminated polyethers. Preferably such polyethers have a molecular weight of greater than about 230 and a functionality of from 2 to 6. Such amine terminated polyethers are typically made from an appropriate initiator to which a lower alkylene oxide is added with the resulting hydroxyl terminated polyol being subsequently aminated. If two or more alkylene oxides are used, they may be present either as random mixtures or as blocks of one or the other polyether. For ease of amination, it is especially preferred that the hydroxyl groups of the polyol be essentially all secondary hydroxyl groups. Typically, the amination step replaces the majority but not all of the hydroxyl groups of the polyol.

The reaction mixture used to produce the present foamed isocyanate-based polymer typically will further comprise a blowing agent. As is known in the art water can be used as an indirect or reactive blowing agent in the production of foamed isocyanate-based polymers. Specifically, water reacts with the isocyanate forming carbon dioxide which acts as the effective blowing agent in the final foamed polymer product. Alternatively, the carbon dioxide may be produced by other means such as unstable compounds which yield carbon dioxide (e.g., carbamates and the like). Optionally, direct organic blowing agents may be used in conjunction with water although the use of such blowing agents is generally being curtailed for environmental considerations. The preferred blowing agent for use in the production of the present foamed isocyanate-based polymer comprises water.

It is known in the art that the amount of water used as an indirect blowing agent in the preparation of a foamed isocyanate-based polymer is conventionally in the range of from about 0.5 to as high as about 40 or more parts by weight, preferably from about 1.0 to about 10 parts by weight, based on 100 parts by weight of the total active hydrogen-containing compound content in the reaction mixture. As is known in the art, the amount of water used in the production of a foamed isocyanate-based polymer typically is limited by the fixed properties expected in the foamed polymer and by the tolerance of the expanding foam towards self structure formation.

The reaction mixture used to produce the present foamed isocyanate-based polymer typically will further comprise a catalyst. The catalyst used in the reaction mixture is a compound capable of catalyzing the polymerization reaction. Such catalysts are known, and the choice and concentration thereof in the reaction mixture is within the purview of a person skilled in the art. See, for example, U.S. Pat. Nos. 4,296,213 and 4,518,778 for a discussion of suitable catalyst compounds. Non-limiting examples of suitable catalysts include tertiary amines and/or organometallic compounds. Additionally, as is known in the art, when the objective is to produce an isocyanurate, a Lewis acid must be used as the catalyst, either alone or in conjunction with other catalysts. Of course it will be understood by those skilled in the art that a combination of two or more catalysts may be suitably used.

As stated above, the present inventors have surprisingly and unexpectedly discovered that a sub-group of phenolic resins is particularly advantageous to confer load bearing (also referred to as load building) and/or energy absorbing properties to an isocyanate-based foam.

Conventionally, phenolic resins can be divided into two subgroups: Novolak phenolic resins and Resol phenolic resins.

Generally, Novolak phenolic resins are produced by reacting phenol with formaldehyde in a molar ratio of about 1:0.8 under acidic conditions. This relatively slow reaction proceeds to form o- and p-hydroxymethylphenols as follows:

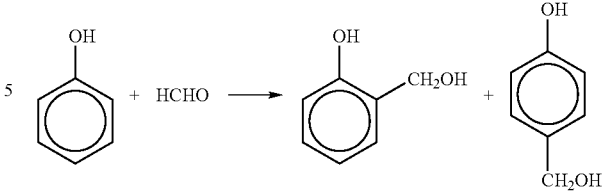

The products then condense rapidly to form products of the bis(hydroxyphenyl)-methane

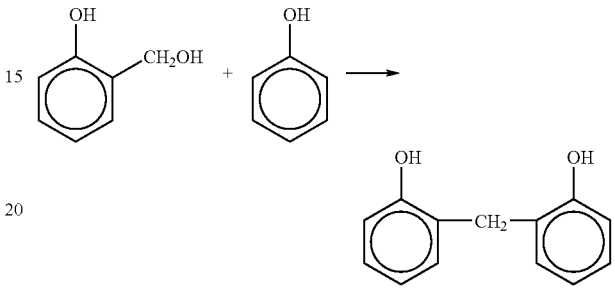

(HPM) type, for example, as follows:

There are three possible isomers for the reaction as follows:

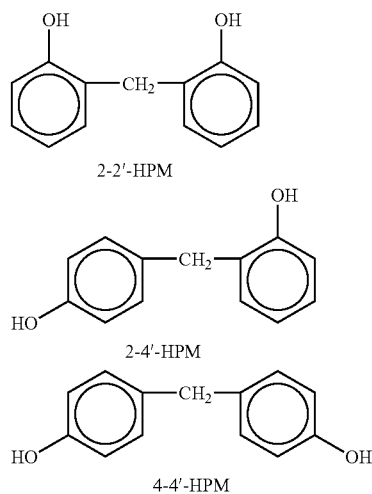

In conventional commercial manufacture of Novolak phenolic resins 2,4'-HPM and 4,4'-HPM compounds are the main products. These products then slowly react with further formaldehyde sequentially to produce higher polynuclear phenols, such as:

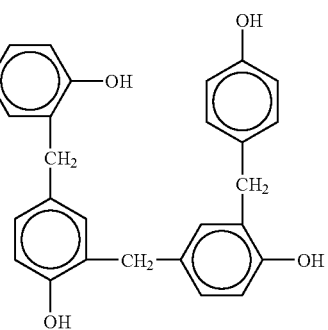

As is apparent, a Novolak phenolic resin is free of any ether moieties. Indeed, throughout this specification the terms "Novolak phenolic resin" and "phenolic resin substantially completely free of ether moieties" are intended to be used interchangeably.

In contrast, a Resol phenolic resin is produced by reacting a phenol with an excess of aldehyde under basic conditions. The resulting polynuclear polyalcohol is characterized by the presence of ether moieties, for example:

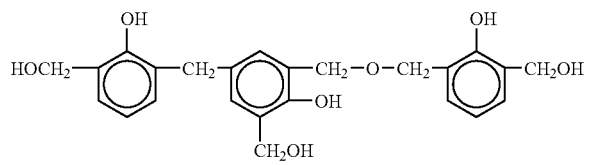

Thus, whereas the Novalak phenolic resin contains no ether moieties, the Resol phenolic resins do contain ether moieties.

The present inventors have surprisingly and unexpectedly discovered that the use of Novolak phenolic resins is particularly advantageous to confer improved load bearing (also referred to as load building) and/or energy absorbing properties to an isocyanate-based foam.

Preferably, the Novalak phenolic resin is present in the reaction mixture in an amount of up to about 20 parts by weight per 100 parts by weight of active hydrogen-containing compound used in the reaction mixture. More preferably, the Novolak phenolic resin is present in the reaction mixture in an amount in the range of from about 1.0 to about 15 parts by weight per 100 parts by weight of active hydrogen-containing compound used in the reaction mixture. Even more preferably, the Novolak phenolic resin is present in the reaction mixture in an amount in the range of from about 1.0 to about 10 parts by weight per 100 parts by weight of active hydrogen-containing compound used in the reaction mixture. Most preferably, the Novolak phenolic resin is present in the reaction mixture in an amount in the range of from about 2.0 to about 20 parts by weight per 100 parts by weight of active hydrogen-containing compound used in the reaction mixture.

Preferably, the Novolak phenolic resin comprises a molecular weight in the range of from about 200 to about 3000.

Preferably, the Novolak phenolic resin comprises a melting point in the range of from about 50° C. to about 150° C., more preferably in the range of from about 75° C. to about 100° C.

Preferably, the Novolak phenolic resin comprises functionality in the range of from about 2 to about 8.

Preferably, the Novolak phenolic resin comprises less than about 0.05% by weight of at least one of, more preferably both of, phenol and formaldehyde.

Preferably the phenolic resin comprises less than about 0.05% by weight phenol and formaldehyde.

As will be clearly understood by those of skill in the art, it is contemplated that conventional additives in the polyurethane foam art can be incorporated in the reaction mixture created during the present process. Non-limiting examples of such additives include: surfactants (e.g., organo-silicone compounds available under the tradename L-540 Union Carbide), cell openers (e.g., silicone oils), extenders (e.g., halogenated paraffins commercially available as Cereclor S45), cross-linkers (e.g., low molecular weight reactive hydrogen-containing compositions), pigments/dyes, flame retardants (e.g., halogenated organo-phosphoric acid compounds), inhibitors (e.g., weak acids), nucleating agents (e.g., diazo compounds), anti-oxidants, and plasticizers/stabilizers (e.g., sulphonated aromatic compounds). The amounts of these additives conventionally used would be within the purview of a person skilled in the art.

Embodiments of the present invention will be described with reference to the following Examples, which are provided for illustrative purposes only and should not be used to limit or construe the scope of the invention.

EXAMPLES 1-3

In each of Examples 1-3, a polyurethane foam using the formulation provided in Table 1 (unless otherwise indicated, all parts are parts by weight). As will be apparent to those of skill in the art, the formulation for Example 1 contained no phenolic resin and the formulation for Example 2 contained Resole phenolic resin. Accordingly, Examples 1 and 2 are provided for comparative purposes only and are outside the scope of the present invention.

The foams of Examples 1-3 were produced according to the following methodology. The polyol, copolymer polymer, phenolic resin/polyol blend (if any), surfactant (Y10184™ and/or DC5169™), catalysts (DABCO™ 33LV and Niax™ A1), cross-linking agent (DEOA-LF) and indirect blowing agent (water) were mixed under conditions of high energy stirring using a high shear mixer. Thereafter, the isocyanate (Lupranate™ T80) was added and the resultant foaming mass was delivered to an open mold. The mold was closed for about 6 minutes and the temperature was maintained at about 70° C. The molded product were extracted and mechanically crushed.

In these Examples, the polyurethane foams were prepared having a copolymer polyol concentration of 16% (Example 1), 10% (Example 2) and 7% (Example 3) by weight of resin using a % $H_2O$ concentration of 3.2% resulting in a foam core density of approximately 32 kg/m$^3$. The Novolak and the Resole concentration was 3% by weight in Example 2 and Example 3, respectively.

The foams produced in Examples 1-3 were subjected to physical testing. Specifically, each foam was test to determine:
  a. the density,
  b. Indentation Force Deflection (IFD) at 50% deflection measured pursuant to ASTM D3574
  c. dry compression set (50% and 75%) measured according to GM specification,
  d. 50% Humid Aged Compression Set (50% HACS) measured according to GM specification.

The results of this physical testing are reported in Table 1. As shown, the introduction of either Novolak phenolic resin (Example 3) or Resole phenolic resin (Example 2) to the polyurethane foam matrix enhances the hardness of foam significantly compared with using copolymer polyol alone (Example 1). However, from an overall perspective, the physical properties of polyurethane foam produced using Novolak phenolic resin (Example 3) were better than those of polyurethane foam produced using Resole phenolic resin.

EXAMPLES 4-5

In Examples 4-5, polyurethane foams having energy absorbing properties were produced using the formulation provided in Table 2 (unless otherwise indicated, all parts are parts by weight). As will be apparent to those of skill in the art, the formulation for Example 4 contained no phenolic resin. Accordingly, Examples 4 is provided for comparative purposes only and is outside the scope of the present invention.

The foams of Examples 4-5 were produced according to the following methodology. The polyol, copolymer polymer, phenolic resin/polyol blend (if any), castor oil, surfactant (Y10184™), catalysts (Niax™ A1 and NP50™), cross-linking agent (DEOA-LF) and indirect blowing agent (water) were mixed under conditions of high energy stirring using a high shear mixer. Thereafter, the isocyanate (Lupranate™ T80 or R7000) was added and the resultant foaming mass was delivered to an open mold. The mold was closed for about 20 minutes and the temperature was maintained at about 60° C. to about 75° C. The molded products were extracted.

In these Examples, the polyurethane foams were prepared having a copolymer polyol concentration of 24% (Example 4) and 0% (Example 5) by weight of resin using a % $H_2O$ concentration of 3.2% resulting in a foam core density of approximately 72 kg/m³. The Novolak concentration in Example 5 was 12% by weight.

The foams produced in Examples 1-3 were subjected to physical testing. Specifically, each foam was test to determine:
 a. the density,
 b. Indentation Force Deflection (IFD) at 25% deflection measured pursuant to ASTM D3574,
 c. Energy Absorption (EA).

The results of this physical testing are reported in Table 2. As shown, the use of Novolak phenolic resin (Example 5) to completely displace copolymer polyol (Example 4) in the formulation resulted in a foam have slightly better energy absorption properties and significantly better IFD. Importantly, the Novolak phenolic resin is significantly cheaper to acquire than the copolymer polyol and thus is more cost efficient as an ingredient to confer load building and/or energy absorbing properties to the foam.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

TABLE 1

| Ingredient | Example 1 | Example 2 | Example 3 |
|---|---|---|---|
| Polyol | 60 | 43 | 43 |
| Copolymer polyol | 40 | 25 | 25 |
| Polyol/Resole Blend | 0 | 32 | 0 |
| Polyol/Novolak Blend | 0 | 0 | 32 |
| DABCO ™ 33LV (catalyst) | 0.35 | 0.30 | 0.30 |
| DEOA-LF (cross-linking agent) | 1.4 | 0.2 | 0.2 |
| Niax ™ A1 (catalyst) | 0.08 | 0.08 | 0.08 |
| Water (indirect blowing agent) | 3.2 | 3.4 | 3.4 |
| Silicone Surfactant (Y10184) | 1.0 | 0.7 | 0.7 |
| Silicone Surfactant (DC5169) | 0 | 0.3 | 0.3 |
| Total Resin | 106.03 | 104.98 | 104.98 |
| Lupranate ™ T80 | 49.8 | 48.5 | 48.5 |
| Isocyanate Index | 100 | 100 | 100 |
| Water (% by wt.) | 3.2 | 3.2 | 3.2 |
| SAN in Resin (% by wt.) | 16 | 10 | 7 |
| Resole in Resin (% by wt.) | 0 | 3 | 0 |
| Novolak in Resin (% by wt.) | 0 | 0 | 3 |
| Density (kg/m³) | 32 | 32 | 32 |

TABLE 1-continued

| Ingredient | Example 1 | Example 2 | Example 3 |
|---|---|---|---|
| 50% IFD (N) | 219 | 218 | 220 |
| Dry compression set (50%) | 6 | deformed | 9 |
| Dry compression set (75%) | 6 | deformed | 8 |
| Humid Aged Compression Set (50%) | 15 | deformed | 18 |

TABLE 2

| Ingredient | Example 4 | Example 5 |
|---|---|---|
| Polyol | 42.2 | 35 |
| Copolymer polyol | 57.8 | 0 |
| Castor oil | 0.15 | 0.15 |
| Polyol/Novolak Blend | 0 | 65 |
| DEOA-LF (cross-linking agent) | 0.18 | 0.18 |
| Niax ™ A1 (catalyst) | 0.08 | 0.08 |
| Water (indirect blowing agent) | 3.2 | 3.2 |
| Silicone Surfactant (Y10184) | 0.14 | 0.14 |
| NP50 ™ | 0.19 | 0.19 |
| Total Resin | 103.94 | 103.94 |
| Lupranate ™ T80 or R7000 | 73.4 | 73.4 |
| Isocyanate Index | 100 | 100 |
| Water (% by wt.) | 3.2 | 3.2 |
| SAN in Resin (% by wt.) | 24 | 0 |
| Novolak in Resin (% by wt.) | 0 | 12 |
| Density (kg/m³) | 72 | 72 |
| 25% IFD (N) | 165 | 237 |
| Energy Absorption (%) | 85 | 86 |

What is claimed is:

1. A foamed isocyanate-based polymer derived from a reaction mixture comprising an isocyanate, an active hydrogen-containing compound, a phenolic resin and a blowing agent; wherein the phenolic resin: (i) is free of ether moieties, and (ii) comprises a melting point in the range of from 50° C. to 100° C.

2. The foamed isocyanate-based polymer defined in claim 1, wherein the active hydrogen-containing compound is selected from the group consisting of polyols, polyamines, polyamides, polyimines and polyolamines.

3. The foamed isocyanate-based polymer defined in claim 1, wherein the active hydrogen-containing compound comprises a polyol.

4. The foamed isocyanate-based polymer defined in claim 3, wherein the polyol is a polyether polyol.

5. The foamed isocyanate-based polymer defined in claim 4, wherein the polyether polyol has a molecular weight in the range of from about 200 to about 10,000.

6. The foamed isocyanate-based polymer defined in claim 5, wherein the polyether polyol has a molecular weight in the range of from about 2000 to about 7,000.

7. The foamed isocyanate-based polymer defined in claim 6, wherein the polyether polyol has a molecular weight in the range of from about 2,000 to about 6,000.

8. The foamed isocyanate-based polymer defined in claim 7, wherein the isocyanate is selected from the group consisting of 2,4-toluene diisocyanate, 2,6-toluene diisocyanate and mixtures thereof.

9. The foamed isocyanate-based polymer defined in claim 8, wherein the isocyanate is selected from the group consisting essentially of (i) 2,4'-diphenylmethane diisocyanate, 4,4'-diphenylmethane diisocyanate and mixtures thereof; and (ii)

mixtures of (i) with an isocyanate selected from the group consisting of 2,4-toluene diisocyanate, 2,6-toluene diisocyanate and mixtures thereof.

10. The foamed isocyanate-based polymer defined in claim 9, wherein the blowing agent comprises water.

11. The foamed isocyanate-based polymer defined in claim 10, wherein the reaction mixture comprises phenolic resin in an amount of up to about 20 parts by weight per 100 parts by weight of active hydrogen-containing compound used in the reaction mixture.

12. The foamed isocyanate-based polymer defined in claim 11, wherein the reaction mixture comprises phenolic resin in an amount in the range of from about 1.0 to about 15 parts by weight per 100 parts by weight of active hydrogen-containing compound used in the reaction mixture.

13. The foamed isocyanate-based polymer defined in claim 12, wherein the reaction mixture comprises phenolic resin in an amount in the range of from about 1.0 to about 10 parts by weight per 100 parts by weight of active hydrogen-containing compound used in the reaction mixture.

14. The foamed isocyanate-based polymer defined in claim 13, wherein the reaction mixture comprises phenolic resin in an amount in the range of from about 2.0 to about 20 parts by weight per 100 parts by weight of active hydrogen-containing compound used in the reaction mixture.

15. The foamed isocyanate-based polymer defined in claim 14, wherein the phenolic resin comprises a molecular weight in the range of from about 200 to about 3000.

16. The foamed isocyanate-based polymer defined in claim 15, wherein the phenolic resin comprises a melting point in the range of from 75° C. to 100° C.

17. The foamed isocyanate-based polymer defined in claim 16, wherein the phenolic resin comprises a functionality in the range of from about 2 to about 8.

18. The foamed isocyanate-based polymer defined in claim 17, wherein the phenolic resin comprises less than about 0.05% by weight phenol.

19. The foamed isocyanate-based polymer defined in claim 18, wherein the phenolic resin comprises less than about 0.05% by weight formaldehyde.

20. The foamed isocyanate-based polymer defined in claim 19, wherein the phenolic resin comprises less than about 0.05% by weight phenol and formaldehyde.

21. A molded foam comprising the foamed isocyanate-based polymer defined in claim 1.

22. A slab foam comprising the foamed isocyanate-based polymer defined in claim 1.

23. A process for producing a foamed isocyanate-based polymer comprising the steps of:
contacting an isocyanate, an active hydrogen-containing compound, a phenolic resin and a blowing agent to form a reaction mixture; and
expanding the reaction mixture to produce the foamed isocyanate-based polymer;
wherein the phenolic resin: (i) is free of ether moieties, and (ii) comprises a melting point in the range of from 50° C. to 100° C.

24. The process defined in claim 23, wherein the active hydrogen-containing compound is selected from the group consisting of polyols, polyamines, polyamides, polyimines and polyolamines.

25. The process defined in claim 24, wherein the active hydrogen-containing compound comprises a polyol.

26. The process defined in claim 25, wherein the polyol is a polyether polyol.

27. The process defined in claim 26, wherein the polyether polyol has a molecular weight in the range of from about 200 to about 10,000.

28. The process defined in claim 27, wherein the polyether polyol has a molecular weight in the range of from about 2000 to about 7,000.

29. The process defined in claim 28, wherein the polyether polyol has a molecular weight in the range of from about 2,000 to about 6,000.

30. The process defined in claim 29, wherein the isocyanate is selected from the group consisting of 2,4-toluene diisocyanate, 2,6-toluene diisocyanate and mixtures thereof.

31. The process defined in claim 30, wherein the isocyanate is selected from the group consisting essentially of (i) 2,4'-diphenylmethane diisocyanate, 4,4'-diphenylmethane diisocyanate and mixtures thereof; and (ii) mixtures of (i) with an isocyanate selected from the group consisting of 2,4-toluene diisocyanate, 2,6-toluene diisocyanate and mixtures thereof.

32. The process defined in claim 31, wherein the blowing agent comprises water.

33. The process defined in claim 32, wherein the reaction mixture comprises phenolic resin in an amount of up to about 20 parts by weight per 100 parts by weight of active hydrogen-containing compound used in the reaction mixture.

34. The process defined in claim 33, wherein the reaction mixture comprises phenolic resin in an amount in the range of from about 1.0 to about 15 parts by weight per 100 parts by weight of active hydrogen-containing compound used in the reaction mixture.

35. The process defined in claim 34, wherein the reaction mixture comprises phenolic resin in an amount in the range of from about 1.0 to about 10 parts by weight per 100 parts by weight of active hydrogen-containing compound used in the reaction mixture.

36. The process defined in claim 35, wherein the reaction mixture comprises phenolic resin in an amount in the range of from about 2.0 to about 20 parts by weight per 100 parts by weight of active hydrogen-containing compound used in the reaction mixture.

37. The process defined in claim 36, wherein the phenolic resin comprises a molecular weight in the range of from about 200 to about 3000.

38. The process defined in claim 37, wherein the phenolic resin comprises a melting point in the range of from 75° C. to 100° C.

39. The process defined in claim 38, wherein the phenolic resin comprises a functionality in the range of from about 2 to about 8.

40. The process defined in claim 39, wherein the phenolic resin comprises less than about 0.05% by weight phenol.

41. The process defined in claim 40, wherein the phenolic resin comprises less than about 0.05% by weight formaldehyde.

42. The process defined in claim 41, wherein the phenolic resin comprises less than about 0.05% by weight phenol and formaldehyde.

43. A liquid mixture comprising an active hydrogen-containing compound and a phenolic resin (i) that is free of ether moieties, (ii) comprises a melting point in the range of from 50° C. to 100° C.

44. A method of conferring a load bearing property to an isocyanate-based polymer foam comprising the step of incorporating a phenolic resin (i) that is free of ether moieties, (ii) comprises a melting point in the range of from 50° C. to 100° C., in a formulation used to produce the foam.

45. A method of conferring an energy absorbing property to an isocyanate-based polymer foam comprising the step of incorporating a phenolic resin (i) that is free of ether moieties, (ii) comprises a melting point in the range of from 50° C. to 100° C., in a formulation used to produce the foam.

* * * * *